Feb. 22, 1927.
L. J. BARGER
LEVEL
Filed Nov. 14, 1922
1,618,262
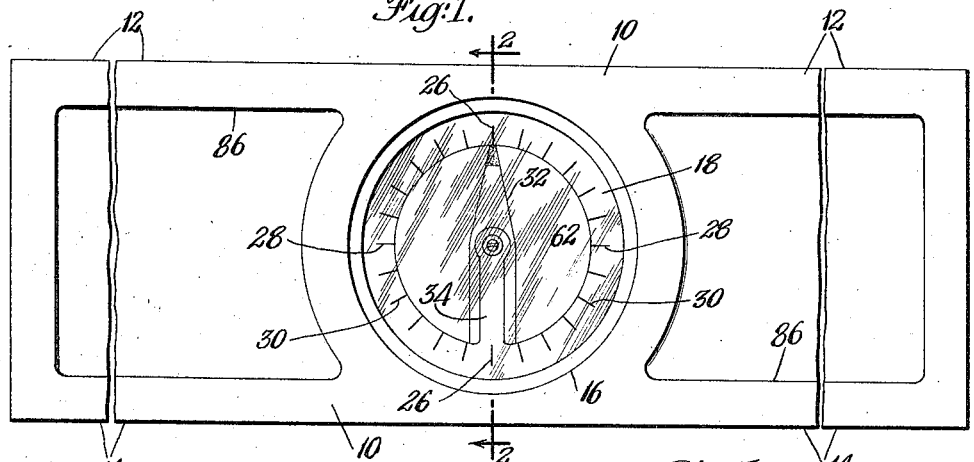
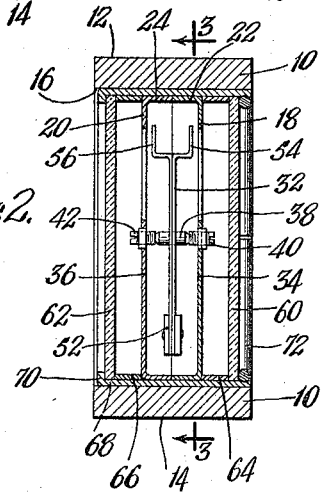
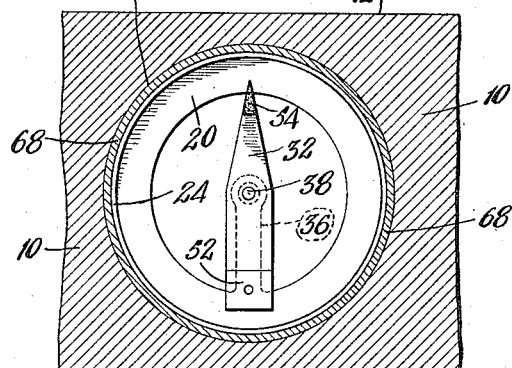
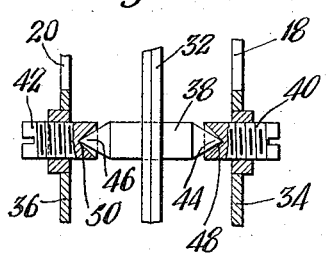
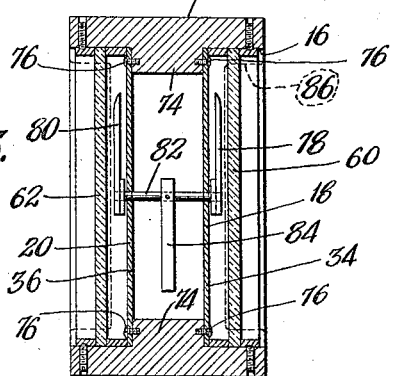
Inventor
Lewis J. Barger
By his Attorney
Benj. T. Rauber.

Patented Feb. 22, 1927.   1,618,262

UNITED STATES PATENT OFFICE.

LEWIS J. BARGER, OF MAPLEWOOD, NEW JERSEY.

LEVEL.

Application filed November 14, 1922.   Serial No. 600,807.

This invention relates to a level of the type used by mechanics and builders for bringing surfaces to a level or a vertical position.

In the ordinary type of levels, having bubble glasses or tubes for indicating when a level or vertical position is attained, considerable difficulty is frequently experienced in reading the position of the level owing to the partly enclosed position of the bubble tubes necessary for mounting the tubes so as to protect them from breaking. This is particularly the case when the surface to be leveled is not on the normal level of the eyes or not readily visible and also when the level is used under conditions where the light is poor or insufficient, as on dark or cloudy days or at seasons of the year when darkness begins to set in during working hours. In these cases it is frequently necessary to read the indications of the level by the aid of a match or other light, which is generally unsatisfactory and inconvenient and occasions danger of fires. Another limitation of the ordinary bubble type of level is the inability to measure deviations from the vertical or horizontal, the bubble tubes being operative only to determine exact vertical and horizontal positions and two tubes being required for this purpose.

An object of the present invention is to provide a level in which the position of the level indicating means is readily visible even when the level is above or below the level of the eyes.

Another object of the invention is to provide a level in which the indicator means is self luminous and readily readable in the dark or in semi-darkness.

A further object of the invention is to provide a level in which deviations from the level or vertical may be accurately measured.

Further objects of the invention are to provide a level of simple, cheap and accurate construction which will withstand rough usage, in which bubble glasses may be eliminated and in which a single, unitary, indicator may be employed for indicating vertical and horizontal positions.

With these and other objects in view, the invention comprises the device described and set forth in the following specification and claim.

The various features of the invention are illustrated in the accompanying drawings in which:

Fig. 1 is a side view of a level embodying a preferred form of the invention, the frame of the level being shown shortened or broken for convenience in illustration, Fig. 2 is a sectional view through the level taken on line 2—2 of Fig. 1, Fig. 3 is a sectional view through the level taken on line 3—3 of Fig. 2, Fig. 4 is a detail view of a portion of the indicating mechanism of the level, and, Fig. 5 is a somewhat diagrammatic sectional view of a modified form of embodiment of the invention.

In the present invention but a single indicating means is required to indicate vertical or horizontal positions or any angle to the horizontal or vertical. This is accomplished by means of a pivoted pointer which is weighted to always hold an exactly vertical position and is mounted in a level frame having straight edges adapted to be placed against the line or surface to be leveled. The inclination of the pointer to the straight edge is indicated by a scale in fixed position to the straight edge and having marks or divisions indicating the angles between the pointer and the straight edge. Upon placing the straight edge of the level on the surface to be leveled, the position of the pointer relative to the scale indicates whether the line or surface is level or vertical or its inclination to the vertical. The tip of the pointer and the scale marks are painted with a self luminous paint to enable them to be read in darkness or semi-darkness.

Referring more particularly to the accompanying drawings, a level frame 10 of any suitable type, in which the indicating device of the present invention is mounted is provided with straight edges 12 and 14 adapted to be placed against the surface to be brought to a level or vertical position. The indicating device is preferably mounted in a transverse opening 16 preferably near the center of the frame. Mounted in this opening is a pair of spaced circular rings or annular plates 18 and 20 having inwardly turned cylindrical flanges 22 and 24 which serve to space the plates 18 and 20 at a uniform distance from each other. The plates 18 and 20 are provided with radial marks 26 extending in a direction from the center of the plates at right angles to the edges 12 and 14, with marks 28 extending parallel with the edges 12 and 14 and with radial marks 30 extending at intermediate angles to the edges 12 and 14 and serving to divide the periphery of the plates into divisions marking various angles to the edges 12 and 14. The plates 18 and 20 are rigidly fixed in the level frame and the marks 26, 28 and 30 are always in fixed relation to the edges of the level.

A pointer 32 is pivotally mounted between a pair of supports 34 and 36, extending radially from the annular plates 18 and 20 and rotates freely in close proximity to the plates 18 and 20. The pointer is made of very light material and is carried on a conically ended spindle 38 supported in conical bearings 40 and 42 mounted in the supports 34 and 36. The bearings 40 and 42 are threaded in the supports in such a manner that they may be adjusted to enable points 44 and 46 on the spindle 38 to accurately fit conical countersunk cavities 48 and 50 in the bearings 40 and 42 to enable the spindle and pointer to rotate without substantial friction in the bearings and to avoid slight displacements from the true vertical.

The pointer 32 extends beyond the spindle 38 and a comparatively heavy weight 52, sufficient to cause the pointer to assume an exactly vertical position when free to rotate on the bearings 40 and 42, is mounted on the extended end of the pointer. The opposite, unweighted end of the pointer is bifurcated to form branches 54 and 56 lying close to the marks on the annular plates 18 and 20 and positioned in a plane with the axis of rotation of the pointer. These branches 54 and 56 are brought to very fine, thin, needle points adjacent the plates 18 and 20 in order that any slight deviation of the pointer from the marks on the plates may be readily detected. The branches 54 and 56 are also in exact alignment with the axis of the pointer so that, by keeping these branches in alignment with the line of vision, any inaccuracies due to parallax may be avoided. In case a very fine reading of the position of the pointer may be desired, a suitable magnifying glass may be mounted on the level.

The position of the pointer and scale markings enables them to be seen and read when the level is placed at a considerable distance above or below the level of vision. To enable the level to be readily used in the dark or semi-darkness, the tips of the pointer and the marks 26, 28 and 30 on the plates 18 and 20 are painted in self-luminous paint.

The elements of the indicating mechanism are protected from injury by means of glass plates 60 and 62 spaced from the annular plates 18 and 20 by means of rings 64 and 66. The indicating mechanism is mounted in a unitary structure in a cylindrical ring 68 rigidly set in the opening 16 and having an upturned flange 70 and a retaining ring 72 for holding the glass plates and spacing rings in position.

In the modification of the invention illustrated in Fig. 5, the opening 16 is provided with a centrally extending ridge 74 to which the plates 18 and 20 are attached by means of screws 76 and the pointer is constructed of separate pointer elements 78 and 80 mounted on the ends of a shaft 82 extending through bearing openings in the supports 34 and 36 and a weight element 84 mounted centrally on the shaft 82. In this form of the invention the pointer elements 78 and 80 pass over the outer surfaces of the plates 18 and 20 at a very slight distance from these surfaces. As indicated, the glass plates 60 and 62 and the spacing rings may be mounted directly on the level frame, thereby dispensing with the ring 68. As indicated at 86 the frame of the level may be of an I construction in cross section.

The above described invention thus provides a level of a very simple and cheap construction and one in which the position of the edges or their inclination to the horizontal or vertical may be accurately and quickly read at all times and under all conditions. It will be understood, however, that various changes may be made in the construction of the device without departing from the broader features of the invention.

Having described the invention what I claim and desire to secure by Letters Patent is:

A device of the type described which comprises a level frame having a transverse opening therethrough, a pair of spaced annular dial plates therein having indicating marks on one side thereof, a support extending from each dial towards its center, each of said dials having an annular flange extending from its outer edge inwardly towards the opposite dial plate, the inner edges of said flanges contacting, a shaft having conical, pointed ends, a pivot pin in each of said supports having a conical recess into which said conical ends of said shaft project, said pivot pins being adjustable axially in said supports, a pointer mounted on said shaft and extending in opposite sides thereof to the edges of said annular dial plates, said pointer being weighted at one end and the other end being bifurcated each bifurcation being pointed to provide a tip adjacent its respective dial, said tips lying in a plane common to said shaft.

In testimony whereof I affix my signature.

LEWIS J. BARGER.